United States Patent [19]

Agrawal et al.

[11] Patent Number: 4,834,956
[45] Date of Patent: May 30, 1989

[54] PROCESS FOR THE PRODUCTION OF HIGH PURITY ARGON

[75] Inventors: Rakesh Agrawal, Allentown; Steven R. Auvil, Macungie, both of Pa.

[73] Assignee: Air Products and Chemicals, Inc., Allentown, Pa.

[21] Appl. No.: 32,113

[22] Filed: Mar. 30, 1987

[51] Int. Cl.⁴ .............................................. C01B 23/00
[52] U.S. Cl. .......................................... 423/262; 55/66
[58] Field of Search ............................. 55/66; 423/262

[56] References Cited

U.S. PATENT DOCUMENTS 4,144,038  3/1979  Armond .................................. 55/58
4,477,265  10/1984  Kumar et al. ......................... 55/26

FOREIGN PATENT DOCUMENTS 833070139  11/1983  European Pat. Off. .
57-174022  10/1982  Japan .
57-226211  12/1982  Japan .
57-215464  12/1982  Japan .

Primary Examiner—Robert L. Stoll
Assistant Examiner—Adriana L. Eng
Attorney, Agent, or Firm—Keith D. Gourley; James C. Simmons; William F. Marsh

[57] ABSTRACT

The present invention is a process for producing a high-purity argon stream from a feed gas containing nitrogen, oxygen and at least 85 mole % argon. Nitrogen is absorbed from the stream followed by catalytic hydrogenation to remove oxygen. The absorption column is regenerated at a preset low pressure using the nitrogen-depleted stream from the absorption unit as the purge gas.

8 Claims, 2 Drawing Sheets

PROCESS FOR THE PRODUCTION OF HIGH PURITY ARGON

TECHNICAL FIELD OF THE INVENTION

The present invention relates to the production of a high purity argon stream from a crude argon stream containing nitrogen, oxygen and at least 85% argon.

BACKGROUND OF THE INVENTION

Traditionally, argon is produced from air in a cryogenic air separation plant. From the cryogenic plant, in addition to the recovery of oxygen and nitrogen-rich streams, a crude argon stream containing between about 94–97% argon, about 3–5% oxygen, and about 0.01–1% nitrogen is also recovered. The crude argon stream is further purified to produce a high purity argon stream. In the first step of this purification scheme, crude argon is mixed with hydrogen and passed through a catalytic hydrogenation unit to react oxygen to form water. This water is then removed, and the remaining gas stream is sent to a cryogenic distillation unit to remove nitrogen. The cost of this cryogenic distillation unit can be fairly high, especially for small sized plants; i.e., less than 12 tons per day (T/D) of argon production, and it can be a substantial fraction of the total argon costs.

Attempts have also been made in the past to purify crude argon without the use of a cryogenic distillation unit to remove nitrogen. In these processes, both nitrogen and oxygen are removed by an adsorption technique. An adsorption bed capable of preferentially adsorbing nitrogen from its admixture with argon and oxygen, by virtue of its general dynamic selectivity for nitrogen, is used to remove nitrogen. Typical examples of these adsorbents are suitable ion exchanged zeolites such as calcium X, lithium mordenite, etc. A second molecular sieve adsorbent bed, which has kinetic selectivity for oxygen, is used to remove oxygen from the mixture. Examples of these molecular sieve adsorbents are some of the carbon molecular sieves, 4A zeolite at a cryogenic temperature, etc.

U.S. Pat. No. 4,144,038 discloses a process whereby crude argon from a cryogenic air separation plant is first passed through a bed of molecular sieve carbon for selective adsorption of oxygen. The unadsorbed effluent, lean in oxygen is subsequently passed through a zeolite bed for selective adsorption of nitrogen. In accordance with this process, both the adsorbents are packed in the same column, and regeneration of the column is performed by simultaneous vacuum desorption of both absorbents in the column.

U.S. Pat. No. 4,477,265 assigned to Air Products and Chemicals, Inc. uses a sequence of nitrogen and oxygen removal for the purification of argon. In accordance with the process described in this patent, nitrogen is first removed from the crude argon followed by oxygen removal from the resultant stream. Nitrogen-selective adsorbents are placed in a separate column from oxygen-selective adsorbents. For a given throughput of the feed gas, a lesser number of oxygen-adsorbing columns than nitrogen-adsorbing columns are used, thereby providing enhanced flexibility for the overall operation.

European patent application No. 83307013.9 discloses a process for obtaining high concentration argon from air by means of pressure swing adsorption, characterized by passing air through zeolite molecular sieve-packed adsorption apparatus and a carbon molecular sieve-packed adsorption apparatus in that order. The air feed is subjected to pressure swing adsorption operations independently in the molecular sieve-packed adsorption columns, to produce concentrated argon and a high purity oxygen product simultaneously.

Other adsorption-based processes for the removal of trace quantities of impurities from argon gas are disclosed in Japanese patent application Nos. 57-174022; and 57-215464.

BRIEF SUMMARY OF THE INVENTION

The present invention is an efficient process for the production of high-purity argon from an impure argon stream containing minor amounts of nitrogen and oxygen. The process is especially suitable for the small scale production; i.e. less than 15 tons/day (T/D), of pure argon from a crude argon stream from a cryogenic air separation unit.

The process comprises passing a feed gas containing nitrogen, oxygen and at least 85 mole % argon to an adsorption column containing an adsorbent for selectively adsorbing nitrogen to produce a nitrogen-lean stream containing oxygen and argon. Subsequently, the pressure of the adsorption column is reduced to below atmospheric pressure, and in some instances as low as 20 torr, to at least partially evacuate the column. The column is then purged using a portion of the nitrogen-lean stream. The remainder of the nitrogen-lean stream is mixed with a stoichiometric quantity of hydrogen relative to oxygen and the resultant stream is passed over a suitable catalyst to form water. The water is removed by any conventional means to produce a high-purity argon stream.

Since the amount of oxygen is most crude argon streams is normally not very high, it is effectively removed in the present process by a one step catalytic operation. The hydrogen consumption associated with the catalytic removal of the oxygen is more than offset by the reduction in the capital investment. Additionally, nitrogen is removed prior to oxygen because the adsorption-based nitrogen-removal process generates a purge stream which is either vented or recycled back to the crude argon-producing process. This purge stream does not have to be oxygen-free and can therefore by recycled directly, without the need for oxygen removal, allowing for a reduction in hydrogen consumption in the catalytic hydrogenation unit. Furthermore, some oxygen is removed from the crude argon by the adsorbent while the nitrogen is being removed, which also reduces the hydrogen requirements.

Another feature which makes the present invention more efficient than other known processes is that the purge to regenerate the spent adsorbent column is at a preset low pressure. Unlike other processes wherein the spent nitrogen-adsorbent column is purged as its pressure is decreased, in the present process the pressure of the column is first reduced to a low value and then purged. This allows for an increase in argon recovery and also reduces the recycle flow to the crude argon production plant.

BRIEF DESCRIPTION OF THE DRAWINGS

The drawing of FIG. 1 is a schematic diagram of a process according to the present invention.

The drawing of FIG. 2 is a flow diagram of one embodiment of the present invention.

DETAILED DESCRIPTION OF THE INVENTION

Figure 1:
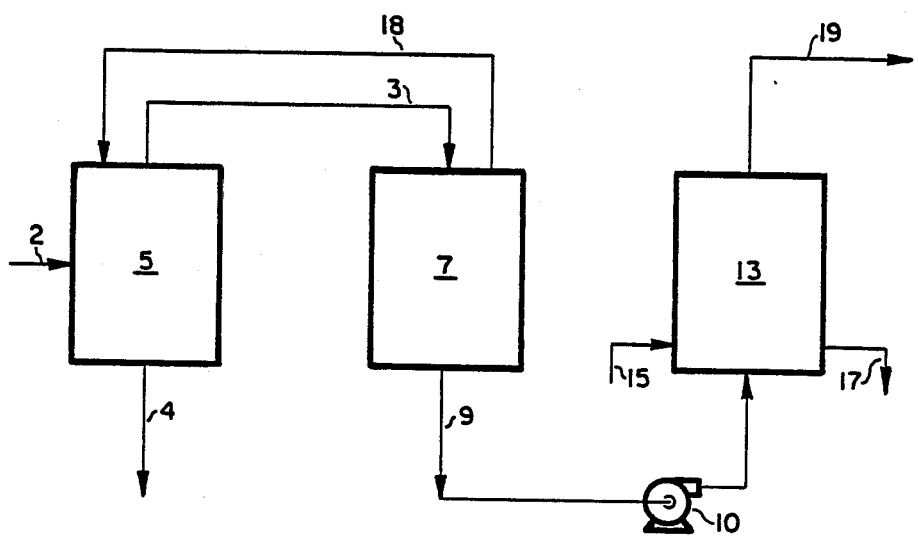

A generalized flow scheme of the present invention is shown in FIG. 1. A crude argon stream 3 containing minor amounts of nitrogen and oxygen, and at least 85 mole % argon and typically between 94–97 mole % argon is recovered from a downstream crude argon production system 5 supplied by feed 2 and is passed to a nitrogen removal unit 7. Other components or products may be recovered from the crude argon production system 5 as stream 4. The nitrogen removal unit 7 is an adsorption column containing an adsorbent which is capable of selectively removing nitrogen from the crude argon stream 3. While any adsorbent which is capable of selectively adsorbing nitrogen can be use, it has been found that many ion exchanged alumino silicate molecular sieve adsorbents are well suited for this process. The best adsorbents to be used are those which have both a high selectivity and a high capacity for retaining dilute nitrogen with a low heat of adsorption and fast kinetics in the adsorption process. Tests have shown that synthetic mordenites, particularly those known commercially as Norton "Zeolon Na," to be well suited for use in the present invention. Other specific adsorbents that have been found particularly useful in the present nitrogen/argon separation include calcium mordenite and calcium-exchanged 13X zeolite. Preferential adsorption of nitrogen by such ion exchanged aluminosilicate molecular sieves is based upon thermodynamic selectivity. The adsorption step on these molecular sieves is preferably carried out at near ambient pressure and at a moderate temperature in the order of about −20° to 30° C.

After nitrogen has been adsorbed in the nitrogen removal unit 7, a nitrogen-lean stream 9 containing oxygen and argon is removed from the adsorption unit 7 and passed via pump 10 to a catalytic unit 13 to remove the oxygen. Prior to, or shortly after being passed to said catalytic unit 13, the nitrogen-lean stream 9 is mixed with a stoichiometric amount of hydrogen, stream 15, with respect to the amount of oxygen contained in the nitrogen-lean stream 9. The hydrogen and oxygen contained in the resulting mixture are converted to water by passing it over a suitable catalyst within unit 13. The resulting water is then removed from the catalytic unit 13 as stream 17 and discarded or used for subsequent operations, and a high purity argon stream 19 is subsequently withdrawn from the catalytic unit 13.

After the nitrogen has been adsorbed from the nitrogen removal system 7, the adsorption bed which was previously on-stream is subsequently reduced in pressure to between about 300 and 20 torr thereby causing evacuation of the column. The column is subsequently purged with a portion of the nitrogen-lean stream produced in the nitrogen removal unit 7. The resultant purged stream 18, after being passed through the adsorbent bed can be either vented or recycled back to the crude argon production unit 5 for further recovery of argon. Recycle of the purge stream 18 will be necessary if very high recoveries of argon are required.

Figure 2:
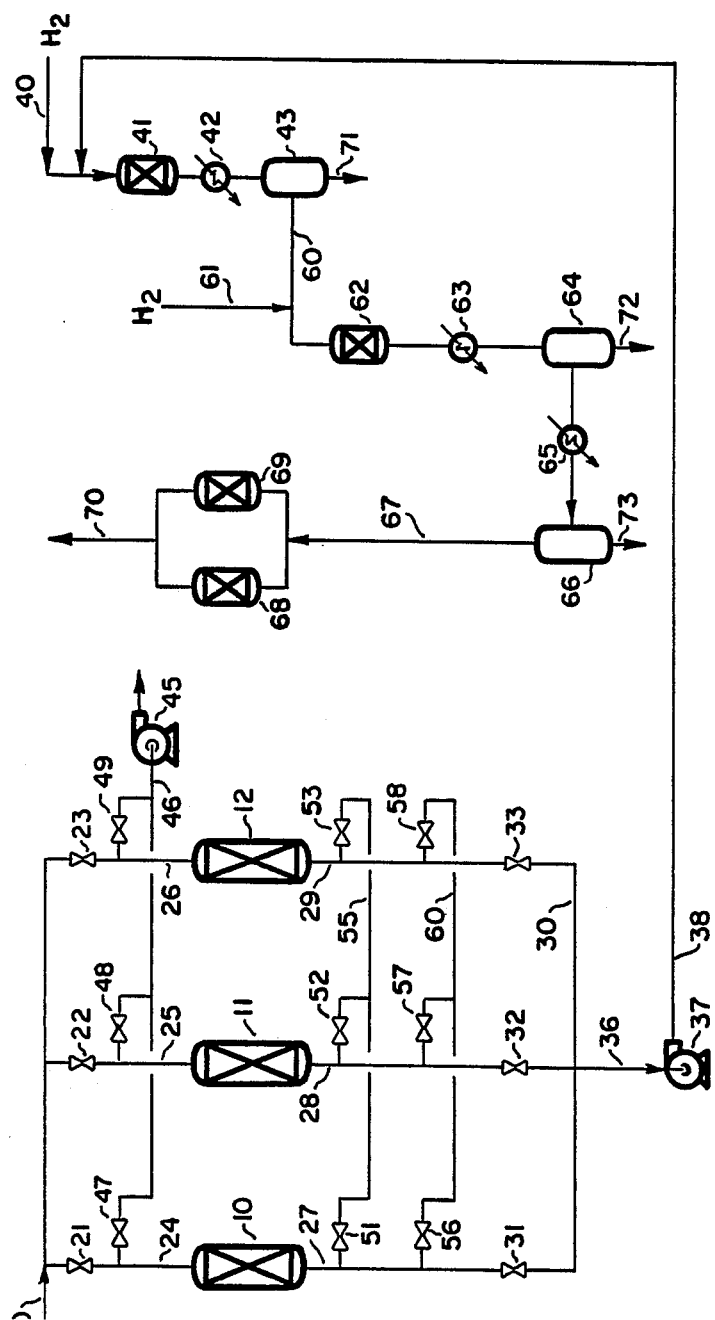

One particular embodiment of the present invention is shown in the drawing of FIG. 2. In this embodiment the adsorption process utilizes a cyclic scheme operating adiabatically around a base temperature of about 0° C. with a moderate swing in pressure levels which may be in the order of about one atmosphere. Each of the nitrogen-adsorption columns during a fixed cycle goes through the sequence of adsorption, evacuation, purge at low pressure, and repressurization. The nitrogen-free gas from the adsorption unit is compressed, mixed with hydrogen, and sent to a catalytic unit to form water. Most of the water formed in the catalytic unit is condensed, and the remainder is removed by the use of adsorbent beds in a drier unit to provide a purified argon product stream.

The layout and operation of the nitrogen-adsorption system will now be discussed in detail. The initial feed of the crude argon stream is through manifold 20 arranged to be selectively connected to sorbent columns 10, 11, and 12, respectively, by means of valves 21, 22, and 23 in lines 24, 25, and 26 connected to the inlets of said columns. Each of the columns, 10, 11, and 12, is provided with a discharge conduit 27, 28, and 29, respectively, at its end opposite the inlet, which conduits all connect to common manifold 36 by means of valves 31, 32, and 33 provided in said conduits. An argon compressor 37 is connected in flow communication with the manifold 30. For purposes hereinafter explained, each of the lines, 24, 25, and 26, is connected to a vacuum pump 45 by means of line 46, into which lines 24, 25, and 26, connect through valves 47, 48, and 49 respectively. Conduits 27, 28, and 29 also connect by valves 51, 52, and 53, respectively, to common manifold 55 and also by valves 56, 57, and 58 to common manifold 60. The process steps using these valves are set out in detail below.

In the operation of the nitrogen-removal system, each of the columns, 10, 11, and 12, undergoes, in cyclic sequence, adsorption, evacuation, purge and repressurization.

The adsorption step generally consists of flowing the feed stream of crude argon through the on-stream column packed with an adsorbent capable of selectively removing nitrogen contained in the feed stream. This step is preferably carried out at near ambient pressure at a moderate temperature in the order of about −20° to 30° C. An effluent stream which is essentially free of nitrogen during said adsorption is withdrawn from the column and the above steps are continued until the exit nitrogen concentration at the discharge outlet from the on-stream column reaches a preset maximum, preferably at a level of about 3 ppm. The sorbent in the on-stream column can now be considered "spent," because it has exhausted its capacity for the desired nitrogen separation.

The evacuation step consists of discontinuing the feed flow through the initial on-stream column and switching the feed to a companion column of that section and evacuating the spent column in a direction opposite to that of the feed. Evacuation of the column is continued until the desired pressure level of the column is reached. In a preferred operation, evacuation is continued until the pressure level in the column is at a level of 20 to 300 torr, desirably at about 100 torr.

Purge at low pressure consists of connecting the freshly evacuated column after evacuation with another column then on the adsorption step and purging the evacuated column using the nitrogen-depleted effluent from the companion column. During this purge, the direction of the gas flow into the column being purged is in a direction opposite to that of the adsorption step. The purge is continued until the effluent from the column being purged is deplete of nitrogen.

The repressurization step, consists of pressurizing the freshly purged column after the purge step to near ambient pressure using the nitrogen-depleted effluent from the companion column. During this pressurization, the direction of the gas flow into the column being pressurized is still in the direction opposite to that of the adsorption step. When this column has been brought to the desired pressure level for the adsorption, a new cycle is started by repetition of the above steps.

In the process described herein, the step sequence between the number of columns is arranged such that the introduction of the crude argon feed, the withdrawal of nitrogen-depleted argon stream, and the operation of the vacuum pump are continuous. A major feature of this process is the purge step at one preset low pressure. As a result, the amount of purge gas required to regenerate the spent bed is significantly less than that of U.S. Pat. No. 4,477,265; and the argon recovery is thus much higher.

The cyclic mode of operation of the process shown in the drawing of FIG. 2 will now be described.

The crude argon stream is brought to about 0° C. and fed via manifold 20 to one of the columns (e.g. column 10) which has previously been pressurized to near the ambient pressure level. Column 10 is at the time in flow communication with another column which needs pressurization (e.g. column 11). The nitrogen-depleted argon effluent from column 10 is partly fed to column 11 via line 60 through valves 56 and 57. The remaining portion of the nitrogen-depleted argon effluent is withdrawn through valve 31 in line 30 and fed to the catalytic unit for oxygen removal via line 36. When the third column 12 is ready for purge, it is brought in communication with column 10 through valves 51 and 53. These valves are regulating valves and control the flow of the nitrogen-depleted argon stream from column 10 to 12.

Once the nitrogen concentration in the argon effluent from column 10 shows a breakthrough of nitrogen (e.g. about 3 ppm), the communication of column 10 to columns 11 and 12 and to line 30 is stopped. The crude argon feed is switched to column 11. Column 10 is then evacuated through open valve 47 in line 46, countercurrent to the direction of the feed introduction, until the pressure level of column 10 reaches the lowest designed pressure level of the operating cycle, preferably about 100 torr. At this point, column 10 is connected to column 11 through valves 51 and 52 and is purged at the lowest pressure by a portion of the nitrogen-depleted argon stream. The purge is continued until the concentration of nitrogen in the purge effluent from column 10 in line 46 has dropped to the lowest value (e.g. about 3 ppm). At this point, column 10 is disconnected from vacuum pump 45; and column 10 is pressurized to about 800 torr with a portion of the nitrogen-depleted argon stream being produced in column 12. After pressurization to the desired level, column 10 is connected to the feed and a new cycle starting with the adsorption step is begun.

Columns 11 and 12 go through the same sequence of steps as column 10. The complete operation of each of the columns during a typical 60 minute cycle is described in Table 1 and the corresponding valve positions during the cycle are set out in Table 2 below.

TABLE 1

Column Operating Sequence for the Nitrogen-Separation System Presented in FIG. 2

| Time (Minutes) | Column 10 | Column 11 | Column 12 |
| --- | --- | --- | --- |
| 0–10 | adsorption | pressurization | evacuation |
| 10–20 | adsorption | pressurization | purge |
| 20–30 | evacuation | adsorption | pressurization |
| 30–40 | purge | adsorption | pressurization |
| 40–50 | pressurization | evacuation | adsorption |
| 50–60 | pressurization | purge | adsorption |

TABLE 2

Valve Positions* for the Nitrogen-Adsorption System Presented in FIG. 2

| Time (minutes) | 21 | 22 | 23 | 31 | 32 | 33 | 47 | 48 | 49 | 51 | 52 | 53 | 56 | 57 | 58 |
| --- | --- | --- | --- | --- | --- | --- | --- | --- | --- | --- | --- | --- | --- | --- | --- |
| 0–10 | O | C | C | O | C | C | C | C | O | C | C | C | O | O | C |
| 10–20 | O | C | C | O | C | C | C | C | O | O | C | O | O | O | C |
| 20–30 | C | O | C | C | O | C | O | C | C | C | C | C | C | O | O |
| 30–40 | C | O | C | C | O | C | O | C | C | O | O | C | C | O | O |
| 40–50 | C | O | C | O | C | O | C | O | C | C | C | O | O | C | O |
| 50–60 | C | C | O | C | C | O | C | O | C | C | O | O | O | C | O |

*O = open, C = closed.
Note:
Valves 51, 52, and 53 may be regulating valves for purging the bed at low pressure; whereas, valves 56, 57, and 58 are for pressurization.

Even though the cycle time used in Tables 1 and 2 was chosen as 60 minutes, any convenient cycle time can be chosen; and columns, pumps, etc. can be appropriately sized to insure the proper production of pure argon and the proper sequencing of the process steps.

A storage tank (not shown) can optionally be used in line 36 of FIG. 2 for storing the nitrogen-depleted argon stream, and also decrease any fluctuation in the nitrogen-depleted argon flow rate to the catalytic hydrogenation unit.

The nitrogen-depleted argon stream from the adsorption unit is passed via line 36 to a compressor 37 where it is compressed to about 3 to 8 atmospheres and sent to a catalytic reactor system through line 38. The nitrogen-depleted argon stream in line 38 is mixed with an amount of hydrogen, stream 40, to remove the desired amount of oxygen prior to being passed to a first catalytic reactor 41. The hydrogen and oxygen are reacted in catalytic reactor 41 to form water which is removed as stream 71 by cooling in heat exchanger 42 followed by separation in separator 43. The resulting argon-enriched stream in line 60 may be further treated to remove additional oxygen by adding additional hydrogen 61 followed by treatment in catalytic reactor 62 and thereafter undergoing further separation to remove formed water (as streams 72 and 73) in separators 64 and 66 and associated heat exchangers 63 and 65, respectively. The resultant stream, rich in argon, is passed via line 67 to driers 68 and 69 to further remove moisture to produce a high-purity argon stream 70. The high-purity argon stream 70 will generally contain less than 50 ppm oxygen and preferably less than about 5 ppm.

While the flow scheme of FIG. 2 employs two catalytic reactors and several separators and heat exchangers, it is understood that one or more of each may be used depending upon equipment and stream size and severity of treatment needed. Additionally, the use of one or more driers is also optional depending upon the specific process parameters.

EXAMPLE 1

Calculations were done for the purification of a crude argon stream from a cryogenic air separation unit in accordance with the flow scheme of FIG. 2. A crude argon stream, containing 97% argon, 2.99% oxygen, and 0.01% nitrogen from the cryogenic crude argon column, is warmed and passed into manifold 20 connecting with the nitrogen removal adsorbent system as described above. The nitrogen-depleted stream is sent in line 36 to the catalytic unit for oxygen removal. The evacuated waste gas from the nitrogen removal unit comprises oxygen, nitrogen, and argon. This gas stream, withdrawn in line 46, is compressed and cooled to a cryogenic temperature and sent back to the main air separation unit to increase the overall recovery of argon.

The product cost for the proposed process was calculated for plant sizes which are able to produce 2 T/D and 12 T/D of pure argon. The concentration of oxygen and nitrogen in the pure argon stream is less than 5 ppm. Calculations were also done to produce the product from the conventional process (Deoxo+cryogenic distillation) and also by the process described in U.S. Pat. No. 4,477,265. The relative product costs for each of the processes are summarized, for both plant sizes, in Table 3 below.

TABLE 3

| | Relative Product Costs | | |
|---|---|---|---|
| | Conventional Process | U.S. Pat. No. 4,477,265 | Present Process* |
| 2 T/D Argon | 1.00 | 0.98 | 0.92 |
| 12 T/D Argon | 1.00 | 1.22 | 1.00 |

*Three-bed system.

The present process is superior to the one described in U.S. Pat. No. 4,477,265 for both plant sizes. Compared to the conventional process, the present invention is about 8% better for 2 T/D pure argon production and about equal for the 12 T/D plant size.

Even though the power consumed by both non-cryogenic processes is higher than the conventional process, the power used by the proposed process is about 30% lower than the one described in U.S. Pat. No. 4,477,265. Furthermore, the argon recovery based on the crude argon feed to the argon purification unit is now about 60–70% higher than the process described in the above-mentioned patent.

The above Example was calculated for a process where three beds are used for the nitrogen-removal adsorption system. However, it should be understood that the number of columns needed depends upon the particular cycle time designed and the capacity of the adsorbents employed. As is well known in the art, the use of several adsorbent beds in parallel is to enable continuous operation of the system, so that while one or more beds are being operated to adsorb contaminant from the influent gas stream, those not so engaged are being subjected to regeneration of the adsorbent and further preparation for return to the adsorption mode.

EXAMPLE 2

Calculations similar to those for Example 1 were done for the production of 2 T/D and 12 T/D of pure argon by using a two-column, nitrogen-removal system with a 40-minute cycle time. In a 40 minute cycle, each column is on the adsorption step for 20 minutes; whereas, for the three-column system of Example 1, each column performed adsorption for 20 minutes out of the 60 minutes (Table 1). As a result, the adsorption columns are more effectively used in a two bed system and the total amount of adsorbent needed for the same production rate of argon is less. Furthermore, the nitrogen removal system having two beds uses less equipment such as valves, etc. than a three bed system, and would be easier to operate. The relative produce costs for all the processes discussed are tabulated in Table 4 below.

TABLE 4

| | Relative Product Costs | | |
|---|---|---|---|
| | Conventional Process | U.S. Pat. No. 4,477,265 | Present Invention* |
| 2 T/D Argon | 1.00 | 0.98 | 0.91 |
| 12 T/D Argon | 1.00 | 1.22 | 0.98 |

*Two-bed system.

It is seen that, in applications where this two-column, nitrogen-removal system can be used, it is the most economical. It extends the applicability of the proposed process to a 12 T/D argon production plant, where it is about 2% better than the conventional process. The power and argon recovery advantages of this two-column system over the process patented in U.S. Pat. No. 4,477,265 are similar to that of the three-column system shown in Example 1.

As seen through the examples, the present invention provides the most economical process for the small scale production of high purity argon from an impure argon stream such as that containing minor amounts of nitrogen and oxygen. The process is especially suitable for the production of pure argon from a crude argon stream such as that from a cryogenic air separation unit. In this case, the process of the present invention is successfully integrated with the cryogenic air separation plant through the recycle of the purge stream from the nitrogen removal system to it. As a result, the overall recovery of argon is high. The product cost for this process to produce 2 T/D and 12 T/D of argon can be 9 to 2% lower than the conventional Deoxo/cryogenic distillation process and is far superior to the process taught in U.S. Pat. No. 4,477,265. It should be apparent that the benefits of the present process will be further enhanced as adsorbents with improved properties for nitrogen removal are discovered.

Furthermore, as compared to the other non-cryogenic argon purification systems, such as the ones taught in U.S. Pat. Nos. 4,144,038 and 4,477,265, the present process uses less equipment and is simpler to operate. Its power consumption is about 30% lower and the argon recovery based on the feed to the purification system is about 60–70% higher than the process shown in U.S. Pat. No. 4,477,265.

When the crude argon stream is purified on a small scale, the capital cost associated with various pieces of equipment is a fairly high component of the overall cost of the process. The present invention successfully reduces some of the expensive pieces of equipment and leads to a substantial reduction in the cost of the process. In a conventional Deoxo/cryogenic process, the capital cost associated with the cryogenic distillation to remove nitrogen is fairly high. In non-cryogenic purification processes, where adsorption is used to remove both nitrogen and most of the oxygen, the capital cost associated with the adsorption system to remove oxygen is very high and makes these processes uneconomical.

These adsorption-based processes have to rely on catalytic processes such as a Deoxo system for the final removal of oxygen from the argon stream. The present invention recognizes that the amount of oxygen present in most of the crude argon streams is normally not very high and can be more effectively removed in one step by a catalytic process. This, of course, increases the consumption of hydrogen; but it has been found that this increase in cost is more than offset by the reduction in the capital investment relative to the process taught in U.S. Pat. No. 4,477,265. Furthermore, the absence of the oxygen removal step by adsorption also leads to a reduction in the power consumption as compared to other non-cryogenic argon purification processes, such as the one shown in U.S. Pat. No. 4,477,265.

Another important feature of the present invention is the sequence in which nitrogen and oxygen are removed from the crude argon stream. In the conventional Deoxo/cryogenic process, oxygen is removed first and is followed by nitrogen removal. In the proposed process, however, nitrogen is removed prior to the oxygen. This is done because the adsorptionbased, nitrogen-removal process generates a purge stream which is either vented or normally recycled back to the crude argon-producing process such as a cryogenic air separation plant. There is no need for this purge stream to be oxygen free. Furthermore, some oxygen is also removed by the adsorbent during the adsorption step which also reduces the consumption of hydrogen and leads to a cost reduction.

Another feature which makes the present invention feasible is the purge at a preset low pressure to regenerate the spent adsorbent column. In other plants, such as the one in U.S. Pat. No. 4,477,265, the spent nitrogenadsorbent column is purged as its pressure is decreased; whereas, in the proposed process, the pressure of the column is first reduced to a low value and then it is purged. Since the mass of gas needed to regenerate a column at a low pressure is less than the one at high pressure, the amount of the nitrogen-depleted argon stream used in the urge step is substantially less for the proposed process. This not only provides an increased argon recovery for the new process but also reduces the recycle flow to the crude argon production plant such as a cryogenic air separation plant.

Having thus described the present invention, what is now deemed appropriate for Letters Patent is set out in the following appended claims.

What is claimed is:

1. A process for purifying crude argon feed gas containing nitrogen, oxygen and at least 85 mole % argon which comprises the steps of:
    a) passing said feed gas to an adsorption column containing an adsorbent for selectively adsorbing nitrogen to produce a nitrogen-lean stream containing oxygen and argon;
    b) subsequently reducing the pressure of said adsorption column to between 300 and 20 torr, thereby causing evacuation of the column;
    c) pruging the evacuated column using a portion of the nitrogen-lean stream;
    d) mixing the remainder of the nitrogen-lean stream with a stoichiometric quantity of hydrogen relative to oxygen and subsequently passing the resultant stream over a suitable catalyst to form water; and
    e) removing said water from the nitrogen-lean stream to produce a purified argon stream;
    whereby removal of oxygen from the nitrogen-lean stream of step a) is effected entirely by passing the resultant stream over the catalyst of step d).

2. A process in accordance with claim 1 wherein said argon stream of enhanced purity has an argon concentration of at least 99 mole %.

3. A process in accordance with claim 1 wherein said adsorbent is an ion exchanged aluminosilicate molecular sieve.

4. A process in accordance with claim 1 wherein said feed gas contains between 2–10 mole % oxygen and 0.01–5 mole % nitrogen.

5. A process in accordance with claim 3 wherein said adsorption is carried out at a pressure between about 1–2 atmospheres and at a temperature between −20° C. to 30° C.

6. A process in accordance with claim 1 wherein said feed gas is generated by a cryogenic air separation plant.

7. A process in accordance with claim 6 wherein the purge from the adsorption column is recycled to the cryogenic air separation plant.

8. A process in accordance with claim 1 wherein two or more adsorption columns in parallel as used.

* * * * *